Sept. 13, 1932.    J. W. DAWSON    1,877,279
PHOTOSENSITIVE DEVICE
Filed May 20, 1930    2 Sheets-Sheet 1

INVENTOR
John W. Dawson.
BY
ATTORNEY

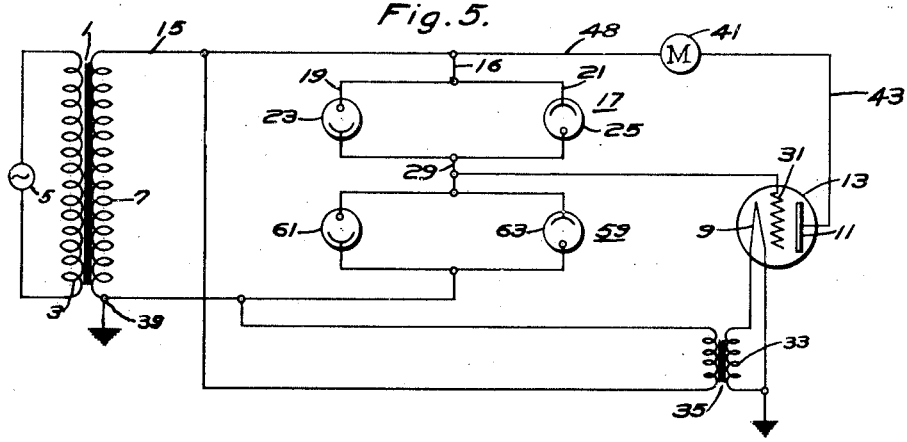
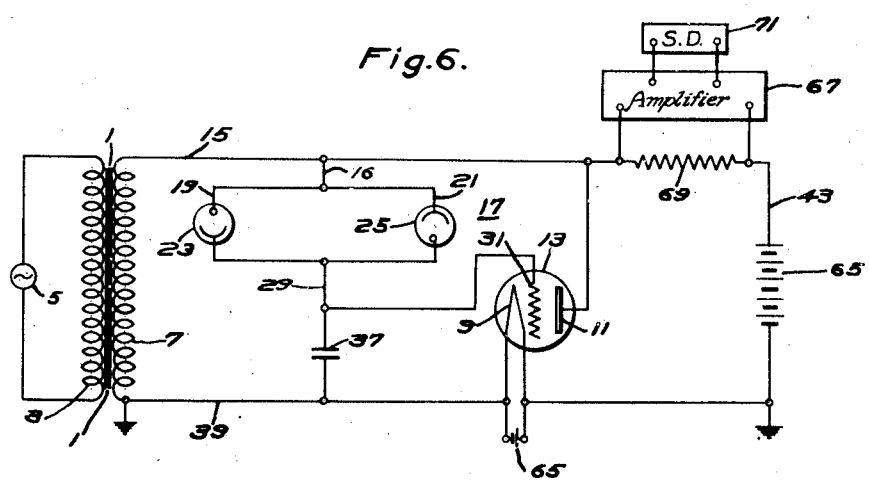
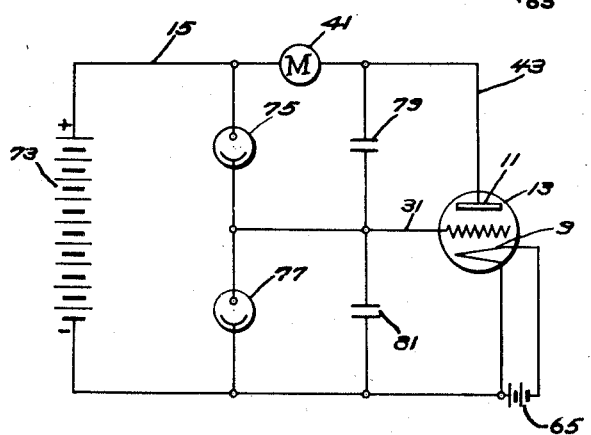

Patented Sept. 13, 1932

1,877,279

UNITED STATES PATENT OFFICE

JOHN W. DAWSON, OF WILKINSBURG, PENNSYLVANIA, ASSIGNOR TO WESTINGHOUSE ELECTRIC & MANUFACTURING COMPANY, A CORPORATION OF PENNSYLVANIA

PHOTOSENSITIVE DEVICE

Application filed May 20, 1930. Serial No. 453,917.

My invention relates to photo-sensitive devices and has particular relation to contrivances for detecting unbalanced conditions in light sources.

It is an object of my invention to provide a device whereby a small difference in the total illuminating flux emitted by a plurality of light sources may be detected.

It is another object of my invention to provide a device whereby a small difference in the intensity of illumination impinging on a plurality of surfaces may be compared.

It is an additional object of my invention to provide a device for detecting small variations in illumination.

Still another object of my invention is to provide a device for detecting small differences in light radiation.

It is an ancillary object of my invention to provide a simple, accurate and inexpensive photometer.

Another ancillary object of my invention is to provide spectroscopic apparatus for determining the multiple structure of spectral lines.

More specifically stated, it is an object of my invention to provide a photo-sensitive device wherein a plurality of photo-cells are so disposed that a small difference in the illumination affecting them so destroys their balance as to cause them to operate an electrical relay.

According to my invention, I provide a photo-sensitive device wherein the potential of the control electrode of an electronic-discharge tube is regulated by the state of excitation of a plurality of photo-cells, so connected in the circuit as to respond to differential illuminating effects.

The anode and cathode, commonly called principal electrodes of the tube, are so related electrically to the control electrode that, for small differences in the illuminating intensity of the light affecting the photo-cells, a large current flows through the tube. The current may be indicated by a meter or other signalling device.

Figure 1:
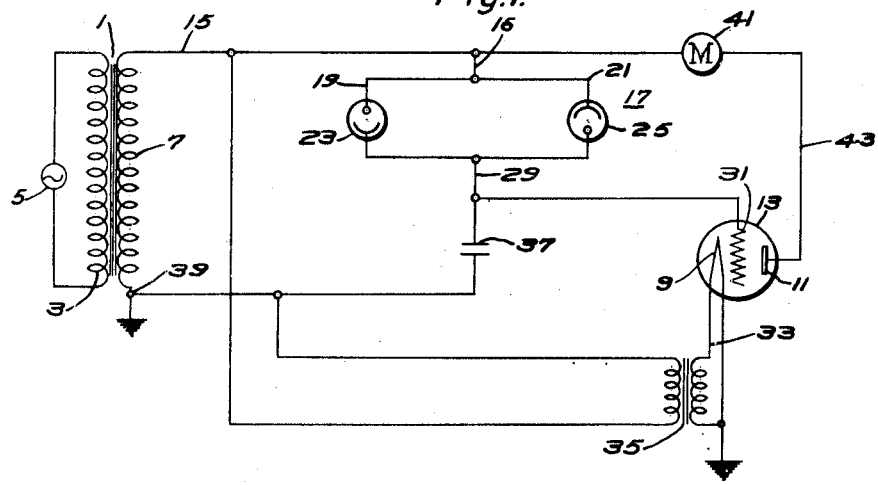
Figure 2:
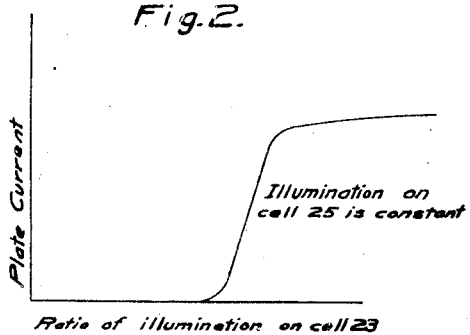
Figure 3:
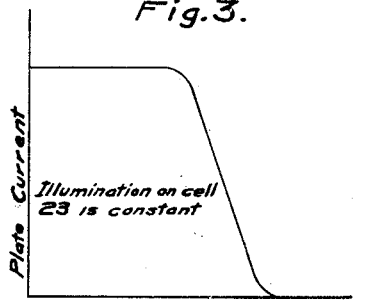
Figure 4:
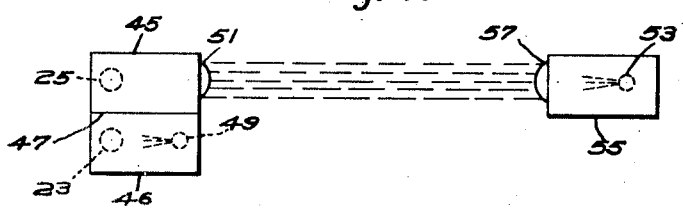

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawings, in which;

Figure 1 is a schematic drawing showing the principal elements of a simple modification of my invention, Fig. 2 is a graph illustrating the effect of one type of differential illumination on the photo-sensitive cells embodied in my invention, as illustrated in Fig. 1, Fig. 3 is a graph illustrating the effect of differential illumination of another type on the photo-sensitive cells, Fig. 4 is a schematic drawing showing the actual disposition of the apparatus embodied in my invention, Fig. 5 is a schematic drawing showing the electrical circuit for a modification of my invention, Fig. 6 is a schematic drawing showing the electrical circuit for another modification of my invention, and Fig. 7 is a schematic drawing showing a modification of my invention wherein a direct-current power source is employed.

The apparatus shown in Fig. 1 comprises a transformer 1, the primary 3 of which is connected to a source 5 of alternating potential and the secondary 7 of which applies a potential between the cathode 9 and the anode 11 of an electron-discharge tube 13. Connected to one terminal 15 of the secondary 7 of the transformer 1, is one terminal 16 of a circuit 17 comprising a plurality of parallel conducting lines 19 and 21, in which are disposed a plurality of photo-sensitive cells 23 and 25.

The cell 23, in the arm 19, is so connected as to pass current in one direction, while the cell 25 in the remaining arm 21 is so connected as to pass current in the opposite direction.

The remaining common terminal 29 of the parallel photo-cell circuit 17 is connected to the control electrode or grid 31 of the electron-discharge tube 13. An impedance 37 is connected between the remaining terminal 39 of the secondary 7 of the transformer 1 and the control electrode, and a meter 41, symbolizing any signalling device, such as a relay, an amplifier, or other apparatus responsive to the action of the tube 13 that it is found desirable to use, is included in the plate circuit 43 of the tube 13.

The cathode 9 of the thermionic tube 13 is heated by the current induced in the secondary 33 of a transformer 35 which is fed from the power transformer 1.

It is to be noted that the electron-discharge tube 13, shown in the drawings, has only symbolical significance, and that an electrical valve of any other type, such as a grid-glow tube, is within the scope of my invention.

It is furthermore, to be noted that, while only two photo-cells 23 and 25 are shown in the circuit in Fig. 1, a circuit including any number of photo-cells connected in any desirable manner is within the range of equivalents of my invention. These photo-cells are, of course, connected in such manner that certain of them pass current in one direction while the remainder pass current in the opposite direction.

Again, as will become obvious from the following explanation, a system wherein the photo-cell circuit 17 and the impedance 37 are interchanged is also operable and falls within the scope of my invention. It is, moreover, well to point out that, instead of connecting the terminal of the photo-cell circuit 17 to the transformer, it is possible to connect the terminal 16 to one of the principal electrodes 9 and 11 of the tube 13.

The photo-electric cells 23 and 25 are energized by a plurality of illuminating sources or by a single source (not shown). The response of the system to the character of the illumination is best illustrated by Figs. 2 and 3.

In Fig. 2, the plate current of the tube 13 is plotted as ordinate and the ratio of the illumination on the photo-cell 23, that draws electrons from the control electrode 31, to the illumination of the remaining photo-cell 25 is plotted as abscissa. It is to be noted that the latter is held constant while the former is varied.

In Fig. 3, the plate current is again plotted as ordinate while the ratio of the illumination on the photo-cell 25 that delivers electrons to the control electrode 31 to the illumination of the remaining photo-cells is plotted as abscissa. In this case, the former is varied while the latter is held constant.

It is seen that, in the region where the illumination on both photo-cells is substantially the same, the current in the tube 13 varies over a considerable range for a comparatively small change in the illumination of one of the photo-cells.

If the illumination on the photo-cell 25 that feeds electrons to the control electrode is increased, the plate current in the tube rapidly decreases to zero, and, if the illumination on the photo-cell 23 that removes the electrons from the control electrode is increased, the plate-current in the tube 13 rapidly rises to its saturation value.

I have found that, although my improved system is responsive to variations in illumination on the photo-cells when an impedance 37 of any type is connected between the control electrode and the lower terminal 39 of the secondary 7 of the power transformer 1, a condenser of comparatively small capacity gives the most satisfactory results. This phenomenon, obviously, arises from the fact that, while a slight variation in the response of the photo-cells 23 and 25 results in an accumulation of charge on the condenser 37 and a consequent accumulation of charge of similar polarity on the control electrode 31, an inductance or a resistor provide a leakage path for the charge and, as a result, their disposition in the system causes a considerable decrease in its sensitivity.

I have, furthermore, found that, in many of its applications, the apparatus, constructed according to my invention, may be operated without the addition of a bias on the grid. It is obvious that, if the necessity of a bias arises, it may be included in the lead 29 or in the lead 39.

It is to be noted that, in the hereinabove given explanation, it was assumed that the photo-electric cells 23 and 25 are equally responsive to the light by which they are influenced. It is, of course, possible to so adjust the intensity of the light sources that the response of the photo-cells is effectively equivalent, although the photo-cells themselves do not have equivalent sensitivity.

The apparatus described hereinabove has particular application to traffic-control equipment. In Fig. 4, the elements constituting such equipment are shown.

The system comprises a plurality of enclosures 45 and 46 having a plurality of photo-sensitive cells 23 and 25 disposed therein that are separated by an opaque partition 47. The cells are connected to an electronic-discharge tube 13 and to a source of potential 5, as shown in Fig. 1, and one of them, the cell 23, is influenced by a source of light 49 disposed within the enclosure 46. The remaining cell 25 faces a condensing lens 51 which is disposed in an opening in the enclosure 45 and is under the influence of a second source of light 53 disposed in a separate enclosure 55 facing a collimating lens 57 in an opening in the enclosure.

When the collimated light is obstructed the state of excitation of the photo-cell 25 under its influence is changed, and the plate current in the tube 13 undergoes a large variation. The variation in the plate current may be employed to operate the necessary moving parts (not shown) embodied in a traffic-control system.

In Fig. 5 a modification of my invention is shown wherein a plurality of photo-electric cell networks 17 and 59 are disposed between both terminals of the primary 7 of the transformer 1, supplying power to the electron-discharge tube 13, and the control electrode of the tube. The photo-electric cells 23, 25, 61 and 63 may be subjected to the influence of any desired combination of illuminating sources. Thus, for example; a complicated system of traffic lights may be operated by the action of the cells.

However, in a preferred modification of my invention, each set of diagonal cells 25 and 61 and 23 and 63 are under the influence of the same source of light. The current which flows to, or away from, the grid 31, in this particular arrangement of the apparatus, is continuous, instead of pulsating. The system represents the analogy of a push-pull arrangement of thermionic tubes, and, obviously, is more sensitive than the system shown in Fig. 1.

It is to be noted that the speed of action of a system constructed according to my invention varies inversely as the capacity disposed between the grid 31 and the cathode 9 of the tube 13, and hence, by reason of the minute capacity of the cells 59 and 61 located between the grid and the cathode of the tube, the apparatus shown in Fig. 5 has extremely rapid action.

In Fig. 6, another modification of my invention is shown, wherein the electronic discharge tube 13 is operated from a direct-current potential source 65. The plate circuit 43 of the tube 13 is coupled to an amplifier 67 through a resistance 69 and feeds into a signalling device 71.

The grid 31 of the tube 13 is, of course, controlled from the photo-cells 23 and 25 that are under the influence of an alternating-current source, in this case.

In the device shown in Fig. 7, an electromotive force is supplied between the anode 9 and the cathode 11 of the tube 13 by a battery 73. A photoelectric cell 75, connected between the positive terminal of the battery 73 and the grid 31 of the tube 13, provides for the removal of electrons from the grid, and a cell 77, connected between the negative terminal of the battery 73 and the grid 31, provides for the supply of electrons to the grid.

Condensers 79 and 81 are connected between the grid and the anode and the grid and the cathode, respectively, and provide for the accumulation of a charge from the cells 75 and 77.

Since the device shown in the drawings operate substantially like the alternating-current devices described hereinabove, an explanation of its operation is hardly necessary.

I have mentioned hereinabove, the application of my invention to traffic-control apparatus, and I have described equipment of this type wherein my system has been embodied. My invention may also be applied to similar equipment, such as smoke-detection apparatus, burglar alarm apparatus, sorting apparatus and counting apparatus. In fact, it may be applied to any type of equipment incorporating two cells wherein the illumination on one cell is interrupted or modified while the illumination on the other cell remains substantially unchanged.

In particular, my invention has wide application in the field of spectroscopy, where it may be used to analyze spectral lines for their multiple structure and for their dispersive reaction to magnetic and electric fields.

In using my invention for spectroscopic purposes, two dispersive devices, such as gratings or prisms, substantially equivalent in their response to light, are subjected to the source or sources of illumination that are being analyzed.

The photo-sensitive cells of a system of the type shown in Figs. 1, 5 or 6 are subjected to the illuminating effect of the light transmitted through, or reflected from, the dispersive devices. The latter are so adjusted that the light impinging on the cells that pass a current flowing to the grid is slightly different in wave-length from the light that effects the cells passing the current flowing away from the grid.

It is obvious that, if there is a difference in the quantity of radient energy emitted by the source at the two wave-lengths, the electron tube will respond to this difference.

The application of my device to photometers is also of particular importance. The equipment for this application may be represented schematically by the unit comprising the two chambers 45 and 47 of Fig. 4.

The lamp 49 and the cell 23 may be regarded as the standard combination and the cell 25 as the comparison device.

In operating the device, the cell 25 is subjected to a source of light which is under test, and the current heating the lamp 49 is varied until a marked change takes place in the circuit 43 of the tube 13. The meter indicating the current in the filament of the lamp 49 may be calibrated in terms of illumination constants.

Illumination control apparatus is, as far as my invention is concerned, substantially the same as photometric apparatus, and the application thereto of my invention is obvious.

The apparatus shown in Fig. 4 may again be regarded as symbolizing this type of equipment. The lamp 49 may be regarded as a pilot lamp which is compared with the external illumination e. g., the lamp 53. The interaction between the cells 25 and 23 effects the necessary regulation of the lighting system that is under control.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A photo-sensitive device comprising a source of potential, an electron-discharge tube connected thereto, said tube being of a type having a control electrode and a plurality of principal electrodes, an impedance connected between said control electrode and one of said principal electrodes, and a plurality of photo-sensitive cells connected between the remaining principal electrode and said control electrode, certain of said cells being so connected as to pass current in one direction relative to said control electrode and the remainder of said cells being so connected as to pass current in the opposite direction relative to said control electrode.

2. A photo-sensitive device comprising a source of potential, an electron-discharge tube of a type having a control electrode and a plurality of principal electrodes, an impedance connected between the said control electrode and one of the terminals of said potential source, and a plurality of photo-sensitive cells connected between the remaining terminal of said source and said control electrode, certain of said cells being so connected as to pass current in one direction relative to said control electrode and the remainder of said cells being so connected as to pass current in the opposite direction relative to said control electrode.

3. An electrical circuit comprising a source of potential, an electron-discharge tube of a type having a control electrode and having a plurality of principal electrodes connected to said source of potential, an impedance connected between one of said principal electrodes and said control electrode, and a multiple impedance device comprising a plurality of arms adapted to be balanced against each other and connected between said remaining principal electrode and said control electrode.

4. An electrical circuit comprising a vacuum tube having an anode, a cathode, and a control electrode, a condenser connected between said control electrode and said cathode, a source of alternating current, a pair of photo-sensitive cells, each cell having a cathode and an anode, the cathode of one cell and the anode of the other cell being connected to said control grid, the anode of said one cell and the cathode of said other cell being connected to one terminal of said source of alternating current and the cathode of said vacuum tube being connected to the other terminal of said source, and a work circuit connected between the anode of said vacuum tube and said one terminal of said source of alternating current.

5. An electrical circuit comprising a vacuum tube having an anode, a cathode, and a control electrode, a condenser connected between said control electrode and said cathode, a source of alternating current, a pair of photo-sensitive cells, each cell having a cathode and an anode, the cathode of one cell and the anode of the other cell being connected to said control grid, the anode of said one cell and the cathode of said other cell being connected to one terminal of said source of alternating current and the cathode of said vacuum tube being connected to the other terminal of said source, and the anode of said vacuum tube being connected to said one terminal of said source of alternating current.

6. An electrical circuit comprising a vacuum tube having an anode, a cathode, and a control electrode, a condenser connected between said control electrode and said cathode, a source of alternating current, a pair of photo-sensitive cells, each cell having a cathode and an anode, the cathode of one cell and the anode of the other cell being connected to said control grid, the anode of said one cell and the cathode of said other cell being connected to one terminal of said source of alternating current and the cathode of said vacuum tube being connected to the other terminal of said source, and means for supplying a voltage to the anode of said vacuum tube.

7. An electrical circuit comprising a vacuum tube having an anode, a cathode, and a control electrode, an impedance unit connected between said control electrode and said cathode, a source of alternating current, a pair of photo-sensitive cells, each cell having a cathode and an anode, the cathode of one cell and the anode of the other cell being connected to said control grid, the anode of said one cell and the cathode of said other cell being connected to one terminal of said source of alternating current and the cathode of said vacuum tube being connected to the other terminal of said source, and the anode of said vacuum tube being connected to said one terminal of said source of alternating current.

8. An electrical circuit comprising a vacuum tube having an anode, a cathode, and a control electrode, an impedance unit connected between said control electrode and said cathode, a source of alternating current, a pair of photo-sensitive cells, each cell having a cathode and an anode, the cathode of one cell and the anode of the other cell being connected to said control grid, the anode of said one cell and the cathode of said other cell being connected to one terminal of said source of alternating current and the cathode of said vacuum tube being connected to the other terminal of said source, and means for supplying a voltage to the anode of said vacuum tube.

9. In an electrical circuit, a source of alternating current, a control unit comprising a pair of photo-sensitive cells each having a cathode and an anode, the anode of one cell being connected to the cathode of the other cell and the cathode of said one cell being connected to the anode of said other cell, a second control unit comprising a condenser, said control units being connected in series with said source of alternating current, and an amplifier tube having input and output circuits, said input circuit being connected across one of said control units.

10. An electrical circuit comprising a vacuum tube having a control electrode and at least two other electrodes, a source of alternating current, a condenser connected between said control electrode and one of said other electrodes, and means connecting said source of alternating current to said condenser for controlling the amount said condenser is charged, said means comprising two photo-sensitive cells connected in parallel with respect to said source of alternating current, said cells also being so connected that one cell conducts current in a direction opposite to the direction of current conduction in the other cell.

In testimony whereof, I have hereunto subscribed my name this 15th day of May 1930.

JOHN W. DAWSON.